United States Patent
Liu et al.

(10) Patent No.: US 9,898,471 B1
(45) Date of Patent: Feb. 20, 2018

(54) COMPUTER IMPLEMENTED SYSTEM AND METHOD, AND COMPUTER PROGRAM PRODUCT, FOR GENERIC SOURCE CONTROL FOR ORCHESTRATION WORKFLOWS

(71) Applicant: VCE Company, LLC, Richardson, TX (US)

(72) Inventors: Peng Liu, Milpitas, CA (US); Richard Kirchhofer, Raleigh, NC (US); Michael Tan, Palo Alto, CA (US); Gilbert Lau, Cupertino, CA (US)

(73) Assignee: VCE IP Holding LLC, Richardson, TX (US)

(*) Notice: Subject to any disclaimer, the term of this patent is extended or adjusted under 35 U.S.C. 154(b) by 361 days.

(21) Appl. No.: 14/827,122

(22) Filed: Aug. 14, 2015

(51) Int. Cl.
*G06F 17/30* (2006.01)

(52) U.S. Cl.
CPC ...... *G06F 17/30076* (2013.01); *G06F 17/302* (2013.01)

(58) Field of Classification Search
CPC ............. G06F 17/30076; G06F 3/1275; G06F 17/2288; G06Q 10/06; G06Q 10/0633; G06Q 10/103
USPC ........................................ 707/695, 760, 809
See application file for complete search history.

(56) References Cited

U.S. PATENT DOCUMENTS

| | | | | |
|---|---|---|---|---|
| 8,060,391 B2* | 11/2011 | Freire | ........... | G06Q 10/063 705/7.11 |
| 2002/0075293 A1* | 6/2002 | Charisius | ........... | G06Q 10/06 715/704 |
| 2009/0327317 A1* | 12/2009 | Ulmer | ........... | G06Q 10/06 |

* cited by examiner

*Primary Examiner* — Thu-Nguyet Le
(74) *Attorney, Agent, or Firm* — Womble Bond Dickinson (US) LLP (57) ABSTRACT

A system, method and computer program product for generic source control for orchestration workflows. An example method may include receiving orchestration workflow information from an orchestration workflow engine. The received orchestration workflow information may be in a native file format. The received orchestration workflow information may be converted from a native file format to a predefined format. A request to check in the converted orchestration workflow information may be received, and responsive to receiving the request, the converted orchestration workflow information is stored in a source control system. A request to check out the converted orchestration workflow information may be received from a client computer, and, responsive to receiving the request, orchestration workflow change information may be generated, which indicate changes that have been made to the orchestration workflow information. The orchestration workflow change information may be sent to the client computer.

20 Claims, 6 Drawing Sheets

COMPUTER IMPLEMENTED SYSTEM AND METHOD, AND COMPUTER PROGRAM PRODUCT, FOR GENERIC SOURCE CONTROL FOR ORCHESTRATION WORKFLOWS

FIELD OF THE DISCLOSURE

Aspects of the disclosure relate to computing technology and, more particularly, to a system, method, and computer program product for generic source control for orchestration workflows.

BACKGROUND

An orchestration workflow defines a logical flow of activities or tasks from a start event to an end event to accomplish a specific service. Orchestration workflows managed by orchestration engines such as VMware™ vCenter Orchestrator (vCO), which is available from VMware Inc. of Palo Alto, Calif., and Microsoft Windows™ Workflow Foundation, which is available from Microsoft Corporation of Redmond, Wash., include a starting point, an end point and function blocks in between. Each function block has inputs, outputs and coding logic. In addition, information is passed among the function blocks. The orchestration engine can import a workflow having a pre-defined format and export an existing workflow to a file having the same pre-defined format. The file can then be saved to backup storage or checked into a source control system. Orchestration engines typically perform their own version control. Different versions of a workflow can be imported, exported or reverted. The pre-defined file format can be different among different orchestration engines.

Projects that involve collaboration between users of different orchestration engines can involve different versions of a same workflow that are presented in different formats. Current file version and format management deficiencies present challenges to efficient development of projects of this type. For example, to determine if a change has been made to a workflow, a developer has to check the workflow file out of the source control system, import it into the orchestration workflow engine, and read the code in each function block such that a comparison can be made. Moreover, if a project includes multiple orchestration engines and changes are required in different workflows there is no mechanism to review all of the changes in a common place. Additionally, there is nothing to ensure that a change to a workflow version will be enforced if the developer forgets to change the version number. Thus, current approaches do not provide the capability to readily manage the project version and format differences that can be involved in a collaborative environment.

SUMMARY

A system, method, and computer program product for generic source control for orchestration workflows. For example, a method in accordance with some embodiments may include receiving orchestration workflow information from an orchestration workflow engine. Orchestration workflow information may be comprised of a start point, and one or more end points and one or more steps. The received orchestration workflow information is in a native file format, which is a file format used by an orchestration workflow engine that was used to create the orchestration workflow information. The received orchestration workflow information may be converted from a native file format to a predefined format. A request to check in the converted orchestration workflow information may be received, and responsive to receiving the request, the converted orchestration workflow information is stored in a source control system. A request to check out the converted orchestration workflow information may be received from a client computer, and, responsive to receiving the request, orchestration workflow change information, wherein the orchestration workflow change information is information may be generated, which indicate changes that have been made to the orchestration workflow information. The orchestration workflow change information may be sent to the client computer.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Workflows are becoming an increasingly popular method of infrastructure management. This is primarily because workflows are easier to maintain, easier to understand, and provide a visual flow to non-technical users. A user can develop a workflow using a workflow design tool, such as is available in the VMware™ vCO. To design a workflow, the user drags and drops various symbols and connects the symbols with arrows in some embodiments. Generally, a workflow embodies a service fulfillment process. One example would be a workflow that instantiates and deploys a virtual application. Further examples include commissioning a virtual local area network, provisioning a virtual machine, decommissioning a virtual machine, among others.

Figure 1:
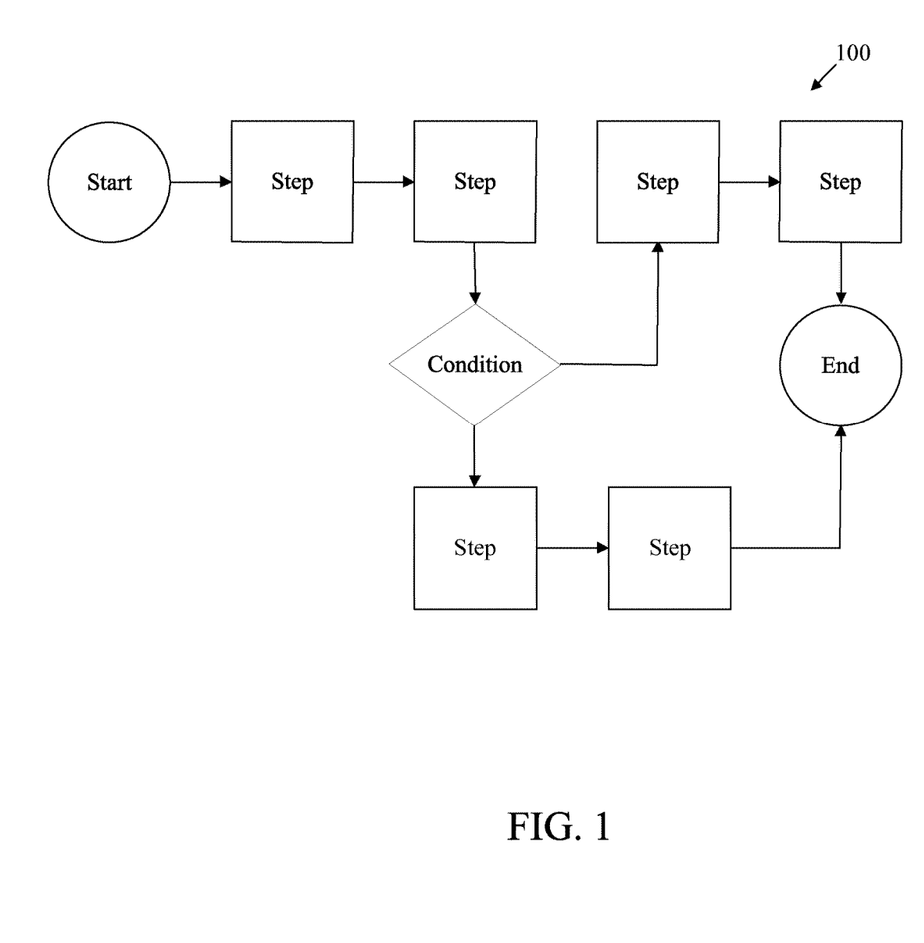
FIG. 1 is an example of a workflow in accordance with some embodiments.

FIG. 1 is an example of a workflow 100. Referring to FIG. 1, workflow 100 defines a logical flow of activities or tasks from a start event to an end event that is designed to accomplish a specific service. The start event initiates the flow of events or steps that are part of workflow 100. As shown in FIG. 1, advancement from steps can involve meeting certain conditions. Whether the condition or conditions are met can determine the path of workflow 100 that is taken from the start event to the end event.

In some embodiments, workflow elements are accessed from a library of workflow elements. Thus, many types of workflows, that can include various symbols, are possible. FIG. 1 is one example of such types of workflows and is not meant to be limiting. The workflow elements that are used to create a workflow may be customized by a user through plug-ins or customizable building blocks.

Figure 2:
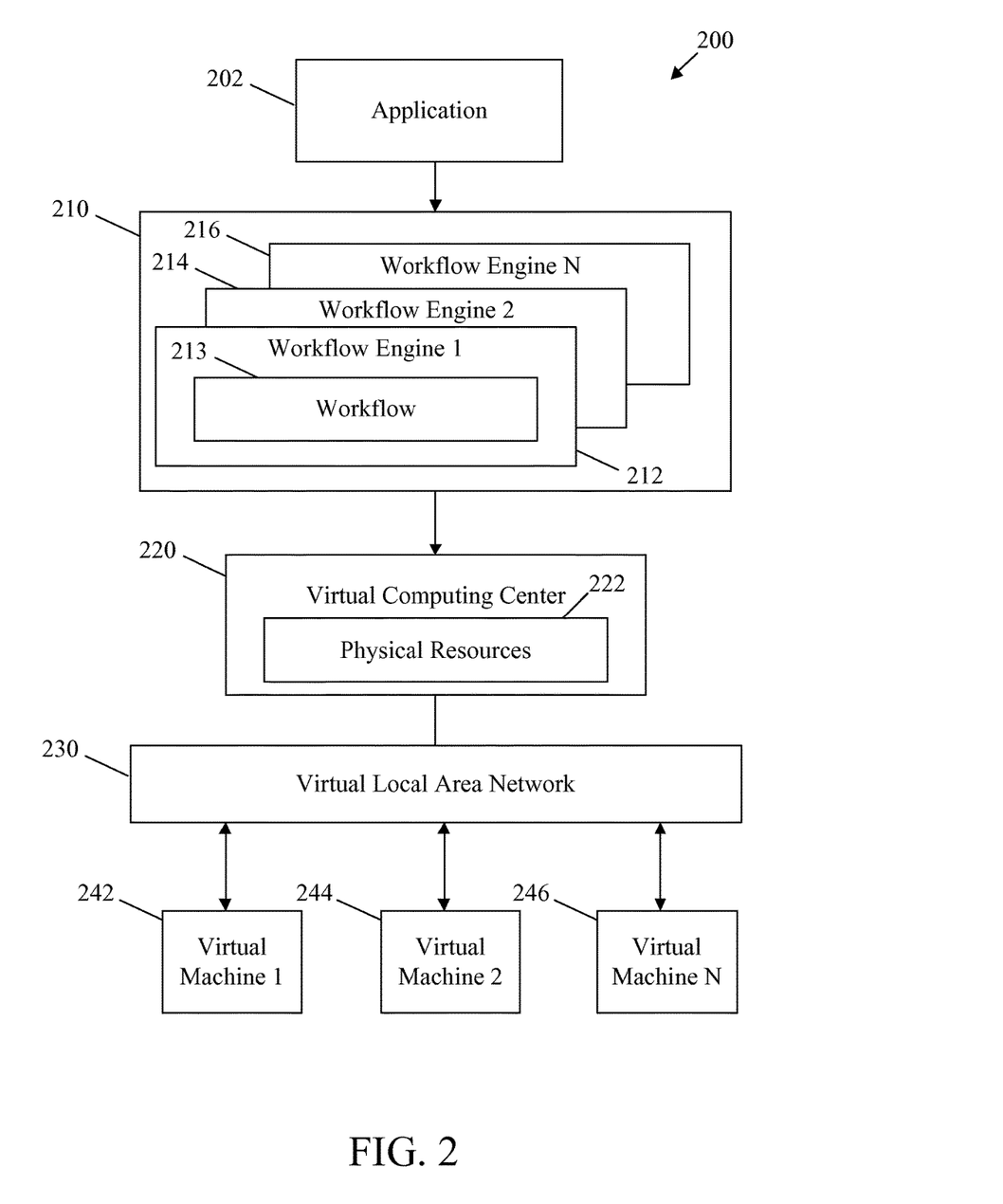
FIG. 2 is a block diagram illustrating an application invoking a plurality of orchestration workflows to execute on a plurality of different orchestration workflow engines, in accordance with some embodiments.

FIG. 2 is a block diagram illustrating an application 202 invoking a plurality of orchestration workflows 213 to execute on a plurality of different orchestration workflow engines 212, 214, 216, in accordance with some embodiments. Application 202 can be implemented as a layer of software that handles workflow execution requests. Physically, application 202 can be implemented in a computer coupled to virtual computing center 220, or can be included in physical resources 222 of a virtual computing center 220, for example as software executing on a processor thereof. Workflow 213 could commission, provision or decommission one or more virtual machines 242, 244 and 246, a virtual local area network (VLAN) 230, or other virtual or physical arrangement of the physical resources 222 available from the virtual computing center 220, as a service fulfillment process, for example. In one embodiment, application 202 and the workflow engine 212, 214, 216 are implemented on the same server, which could be a physical computing resource or a virtual server implemented on physical computing resources. In various embodiments, application 202 and the workflow engine 212, 214, 216 are implemented in various physical computing resources.

Still referring to FIG. 2, application 202 generates a user interface for workflow inputs. This user interface can be in the form of HTML (hypertext markup language). Application 202 accepts user inputs, validates the user inputs, and forwards the request to the workflow 213 resident in a workflow engine 212, 214, 216. Workflow engine 202 may be a virtual or physical computing device, e.g., a virtual server or a physical server, etc. Workflow 213 executes within work flow engine 212, 214, 216 and allocates physical resources 222 in virtual computing center 220. This execution allocates one or more virtual machines 242, 244, 246 and virtual local area network 230, in some embodiments. Application 202 processes a response of the workflow 213, and determines whether to send the response to a portal which initiated the workflow 213, or to retry or restart the workflow 213. Since application 202 is a common interface for all workflow execution requests, functionality such as logging, tracing and exception handling can be handled centrally by application 202, rather than having these functions handled by portals.

Figure 3:
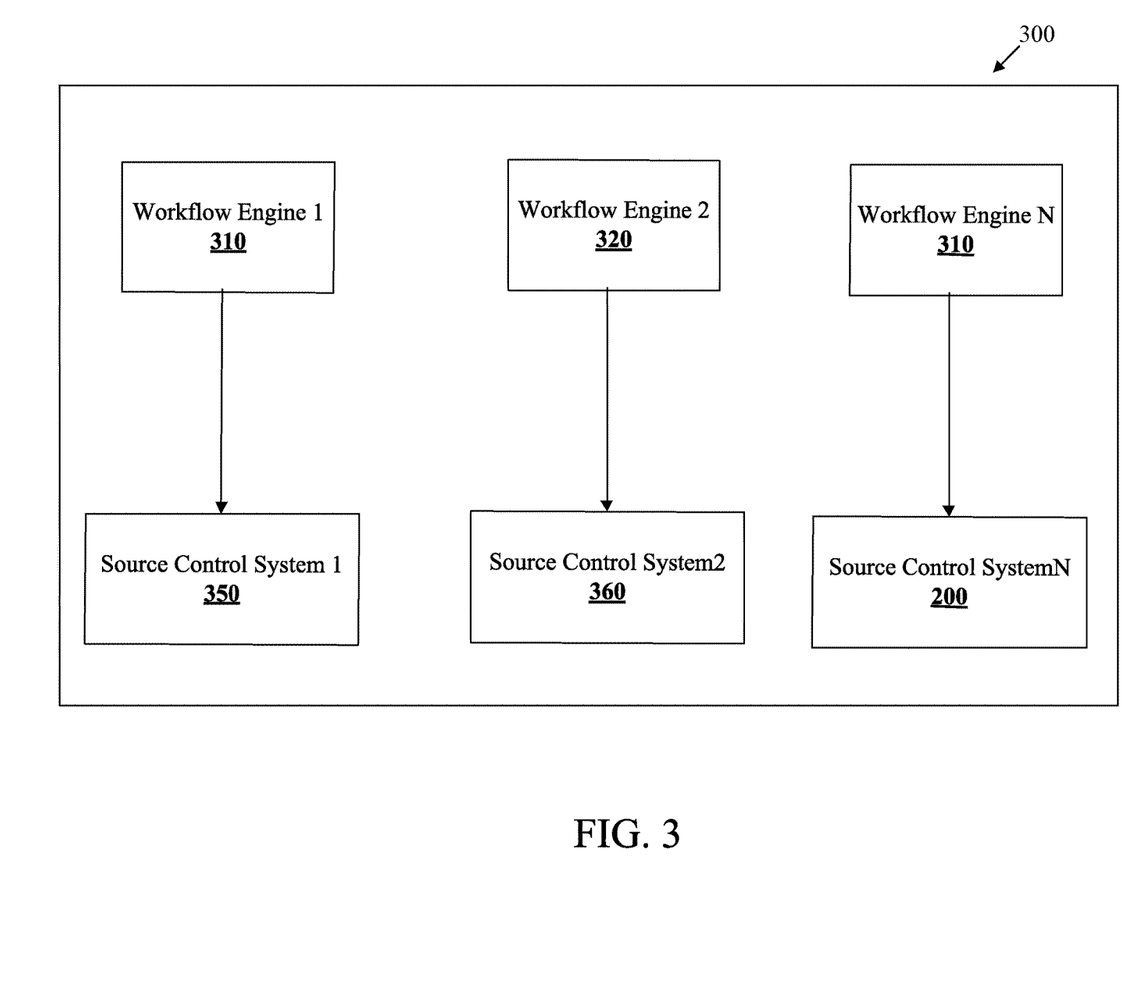
FIG. 3 is a block diagram illustrating an exemplary distributed orchestration workflow development environment.

FIG. 3 is a block diagram illustrating an exemplary prior art distributed orchestration workflow development environment 300. The distributed orchestration workflow development environment 300 includes a plurality of workflow engines, i.e., workflow engine 1 310, workflow engine 2 320, and workflow engine N 330. Exemplary orchestration workflow engines include VMWare™ vCO, Microsoft Windows™ Workflow Foundation and Cisco™ Workflow Engine, which is available from Cisco System, Inc. of San Jose, Calif. The disclosed embodiments are not limited to the foregoing orchestration workflow engines and can be used in connection with other orchestration workflow engines.

The distributed orchestration workflow development environment 300 also includes a plurality of source control systems, i.e., source control system 1 350, source control system 2 360 and source control system N 380. Each of the plurality of source control systems is associated with a particular orchestration workflow engine. As may be appreciated, source control, which is sometimes referred to as version control, is the process of tracking and providing control over changes to computer source code.

Referring to FIG. 3, workflow engines 310, 320, 330 enable the design and implementation of workflows. As a part of the design and implementation of workflows, workflow engines 310, 320, 330 generate user interfaces that enable a user to visually place workflow elements as desired for purposes of providing a desired service. As such, workflow engines 310, 320, 330 provide programming functionality that is encapsulated in workflow elements that allow a user to readily create workflows.

Source control systems 350, 360, 380 (source control systems 1-N) each receive requests from their associated orchestration workflow engines to check in (i.e., store) orchestration workflow information. In response to such requests, source control systems 350, 360, 380 store the orchestration workflow information in their respective data storage components. As may be appreciated, the orchestration workflow information that is received is formatted in the native file format of the orchestration workflow engine 310, 320, 330 that is used to create the orchestration workflow information.

Source control systems 350, 360, 380 also may receive requests to check out the orchestration workflow information. In response to such a request, source control systems 350, 360, 380 provide the requested orchestration workflow information. In addition to providing the requested orchestration workload information, source control systems 350, 360, 380 also may generate and provide orchestration workflow change information. Orchestration workload change information is information that identifies the changes that have been made to an orchestration workflow.

As mentioned above, orchestration workflows may be developed and deployed in a distributed development environment. For example, once a workflow development application, such as, VMWare™ vCO, is connected to a source control system, a first author can add a new workflow project to a shared repository of the source control system. When the first author changes a workflow, the workflow changes can be displayed via a user interface to the workflow development application, and changes are synced between a local and the shared repository. The source control system logs all the source control activities and provides change information to other workflow authors. The source control system may then "commit" the changes, which then makes the changed workflow information available for the other authors. If the second author, who may be remote from the first author, wants to change the workflow, the second author's workflow development application connects to the source control system and checks out the workflow project. When the workflow project is selected from the local repository, the workflow development application recognizes that the locally stored workflow project is not the most recent version and should be synchronized with the version stored in the shared repository. The second author accesses the latest version, modifies it and commits the changes to the source control system. When all the changes are committed, the first author can review all the changes made by the team, including the second author, and prepare the workflow for deployment. The entire history of changes may be accessible, and for each revision to the workflow, the list of files modified or affected by the revision may be updated. When the workflow is ready for deployment, a version number may be assigned for tracking purposes.

Figure 4:
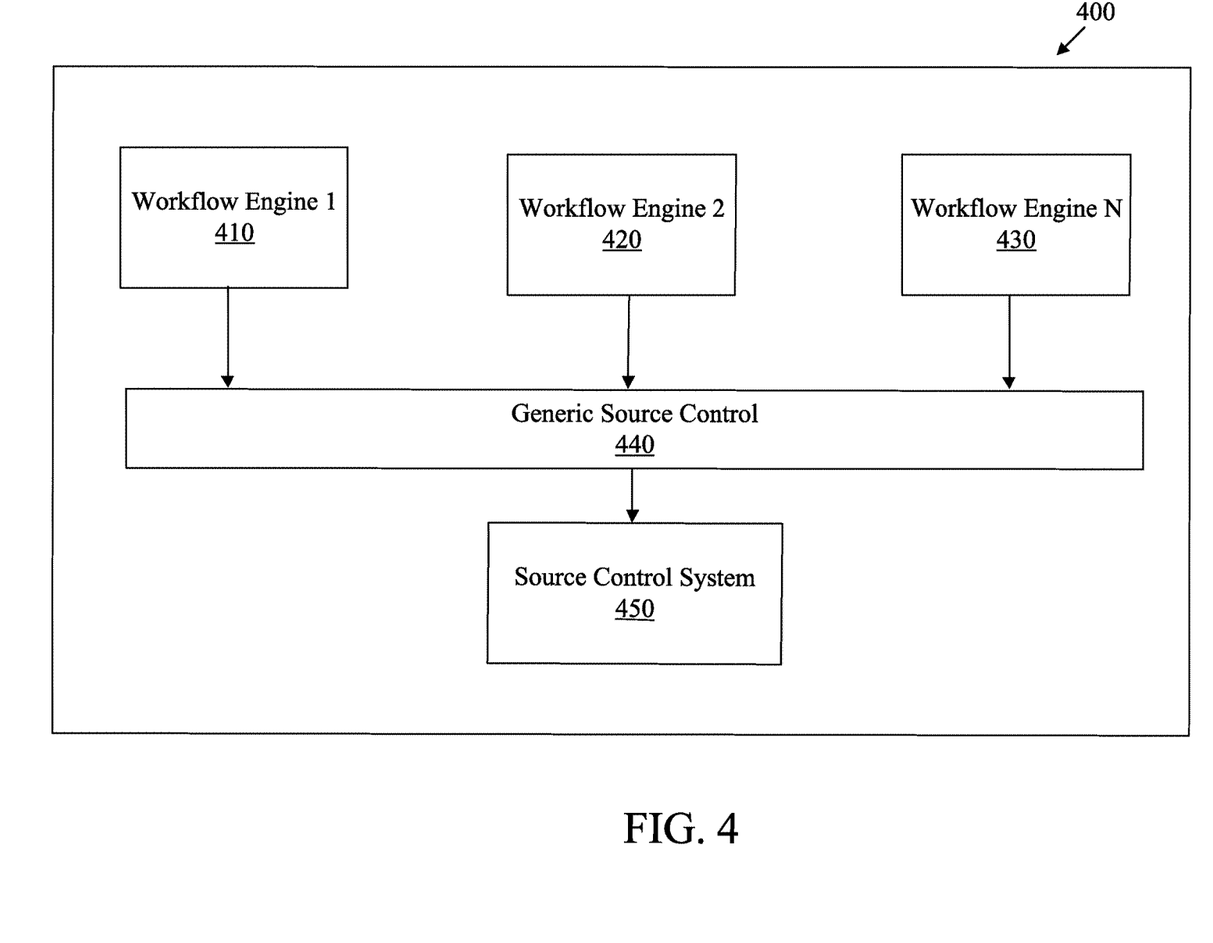
FIG. 4 is a block diagram illustrating a generic source control system for use in a distributed orchestration workflow development environment, in accordance with some embodiments.

FIG. 4 is a block diagram illustrating a generic source control system for use in a distributed orchestration workflow development environment 400, in accordance with some embodiments. As shown in FIG. 4, a distributed orchestration workflow development environment 400 includes a plurality of workflow engines, i.e., workflow engine 1 410, workflow engine 2 420, and workflow engine N 430. Distributed orchestration workflow development environment 400 also includes generic source control system 440 and a single source control system 450.

Referring to FIG. 4, workflow engines 410, 420, 430 (workflow engines 1-N), enable the design and implementation of workflow projects. The operation of workflow engines 410, 420, 430 is similar to the operation of workflow engines 310, 320, 330 described herein above with reference to FIG. 3. For purposes of clarity and brevity, a repeat of those descriptions with reference to workflow engines 410, 420, 430 is not repeated here.

Generic source control system 440 provides generic source control services for workflow engines 410, 420, 430. Generic source control system 440 converts the file format of, and identifies changes in, versions of orchestration workflow information that are received from workflow engines 410, 420, 430. A file format can be converted from a native file format to a predefined file format (and vice versa). A native file format is a file format in which an orchestration workflow engine natively stores orchestration workflow information. In some embodiments, the predefined file format is a text based format, and in other embodiments, the text based format is an extensible markup language (XML). The implementation of disclosed embodiments, however, is not limited to use of XML, and the disclosed embodiments can be implemented using other text based formats.

In operation, in some embodiments, generic source control system 440 can receive converted orchestration workflow information and may be requested by an orchestration workflow engine to check in (i.e., commit) the converted orchestration workflow information. In response to such a request, the converted orchestration workflow information is stored in source control system 450.

Thereafter, when generic source control system 440 receives a request from a client computer to check out the converted orchestration workflow information, generic source control system 440 provides the requested workflow information, also may generate and provide workflow change information. The workflow change information is information that identifies changes that have been made to the orchestration workflow information. In some embodiments, a comparison report can be generated. For example, a comparison report can be generated with respect to a single workflow. In addition, generic source control system 440 can generate an overall comparison report with respect to the entire source code stream. The comparison report can include a line by line record of changes made in a workflow.

In some embodiments, generic source control service 440 can receive workflow invocation requests. A workflow invocation request can include information identifying an orchestration workflow to be invoked by an orchestration workflow engine 410, 420, 430. Generic source control service 440 determines if a particular version of the identified orchestration workflow that is stored in source control system 450 is newer than other versions of the identified orchestration workflow that are stored in source control system 450. Thereafter, generic source control service 440 selects the newest version of the identified orchestration workflow stored in source control system 450 for execution by the orchestration workflow engine 410, 420, 430.

In some embodiments, generic source control service 440 may be implemented using a plurality of plug-ins to each of the orchestration workflow engines comprising the distributed orchestration workflow development environment 400. As may be appreciated, a plug-in is a software component that extends the functionality of an existing software application, such as an orchestration workflow engine. Each of the plurality of plug-ins is registered with one of orchestration workflow engines 410, 420, 430.

In some embodiments, generic source control service 440 receives orchestration workflow information for each of the orchestration workflow engines 410, 420, 430 via a registered plug-in. Each plug-in can covert orchestration workflow information from the native file format to a predefined file format, such as XML. In some embodiments, an exemplary format is structured as follows:

```
<input>
    <parameter name="in-a" type="string" I>
    <parameter name="in-b" type="number"/>
</input>
<attributes>
    <parameter name="attr-a" type="string" I>
    <parameter name="attr-b" type="number" I>
</attributes>
<blocks>
    <block name="b1 k-a">
        <input>
            <parameter name="block-in-a" type="string"/>
            <parameter name="block-in-b" type="string" I>
        </input>
        <output>
            <parameter name="block-out-a" type="string"/>
            <parameter name="block-out-b" type="string" I>
        </output>
        <code>
        </code>
    </block>
</blocks>
<output>
    <parameter name="out-a" type="string" I>
    <parameter name="out-b" type="number" I>
</output>
```

Referring to FIG. 4, distributed orchestration workflow development environment 400 includes a source control system 450. Exemplary source control systems that can be used in connection with the disclosed embodiments include GitHub, which is available from GitHub, Inc. of San Francisco, Calif., and Apache™ Subversion®, which is available from The Apache Software Foundation of Forest Hills, Md. As may be appreciated, the implementation of the disclosed embodiments is not limited to the foregoing source control systems and other source control systems may be used.

Figure 5:
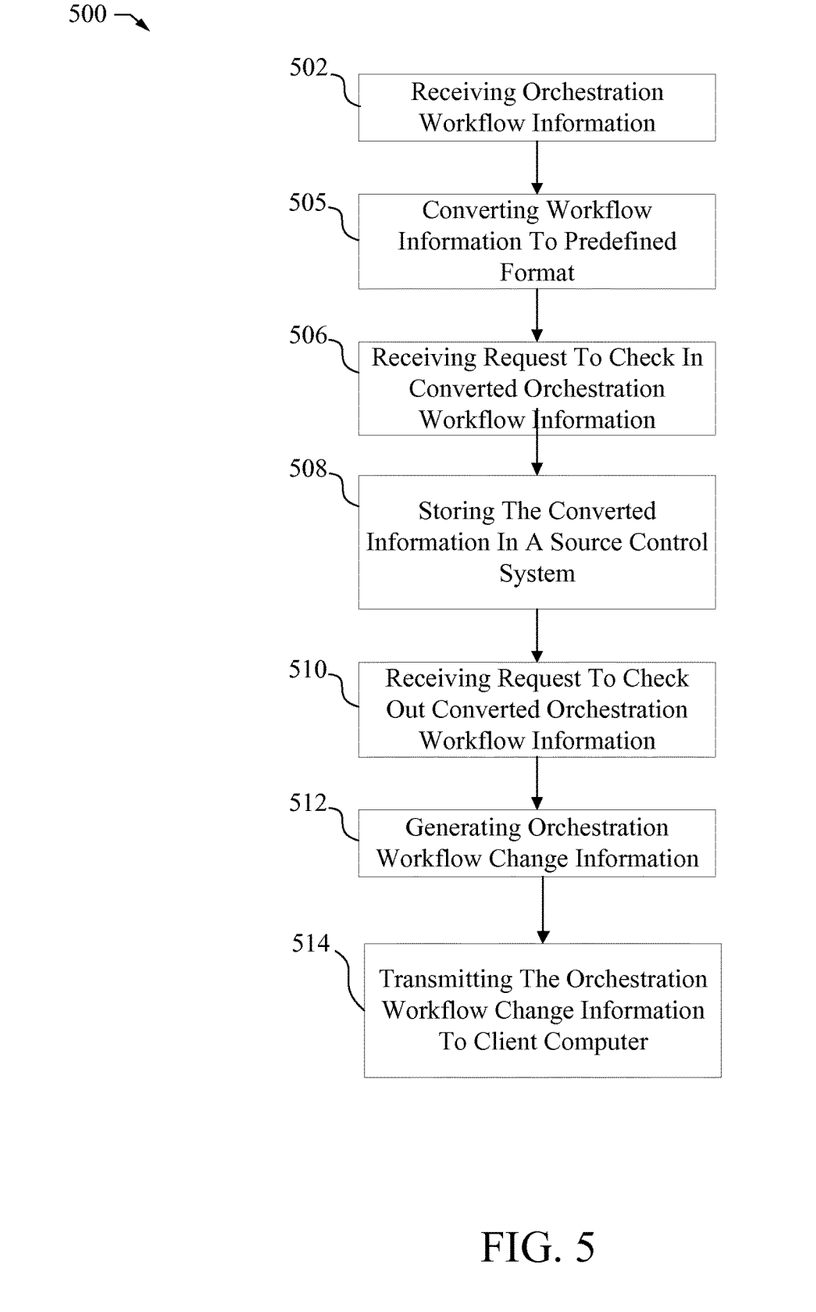
FIG. 5 illustrates a process flow diagram for a generic source control in for use in a distributed orchestration workflow development environment, in accordance with some embodiments.

FIG. 5 illustrates a flow diagram for a process 500 for generic source control for use in a distributed orchestration workflow development environment, in accordance with some embodiments. Process 500 may begin with operation 502, where orchestration workflow information is received from an orchestration workflow engine. As discussed above, orchestration workflow information may include information about a start point, one or more end points and one or more steps. The received orchestration workflow information can be in a native file format. The native file format can be a format used by the orchestration workflow engine that was used to create the orchestration workflow information. Processing control may be then transferred to operation 504.

In operation 504, the received orchestration workflow information is converted from the native file format to a predefined format, such as a text based format, such as XML. Processing control may be then transferred to operation 506.

In operation 506, a request is received to check in the converted orchestration workflow information. The converted workflow information may be checked in to a source control system, as described above. Processing control may be then transferred to operation 508.

In operation 508, responsive to receiving the request to check in the converted orchestration workflow information, the converted orchestration workflow information is stored in a source control system. Processing control may be then transferred to operation 510.

In operation 510, a request is received to check out the converted orchestration workflow information. Processing control may be then transferred to operation 512.

In operation 512, responsive to receiving the request to check out the converted orchestration workflow information, orchestration workflow change information may be generated. The orchestration workflow change information is information that identifies changes that have been made to the orchestration workflow information. Processing control may be then transferred to operation 514.

In an action 514 the orchestration workflow change information may be transmitted to a workflow orchestration engine.

Figure 6:
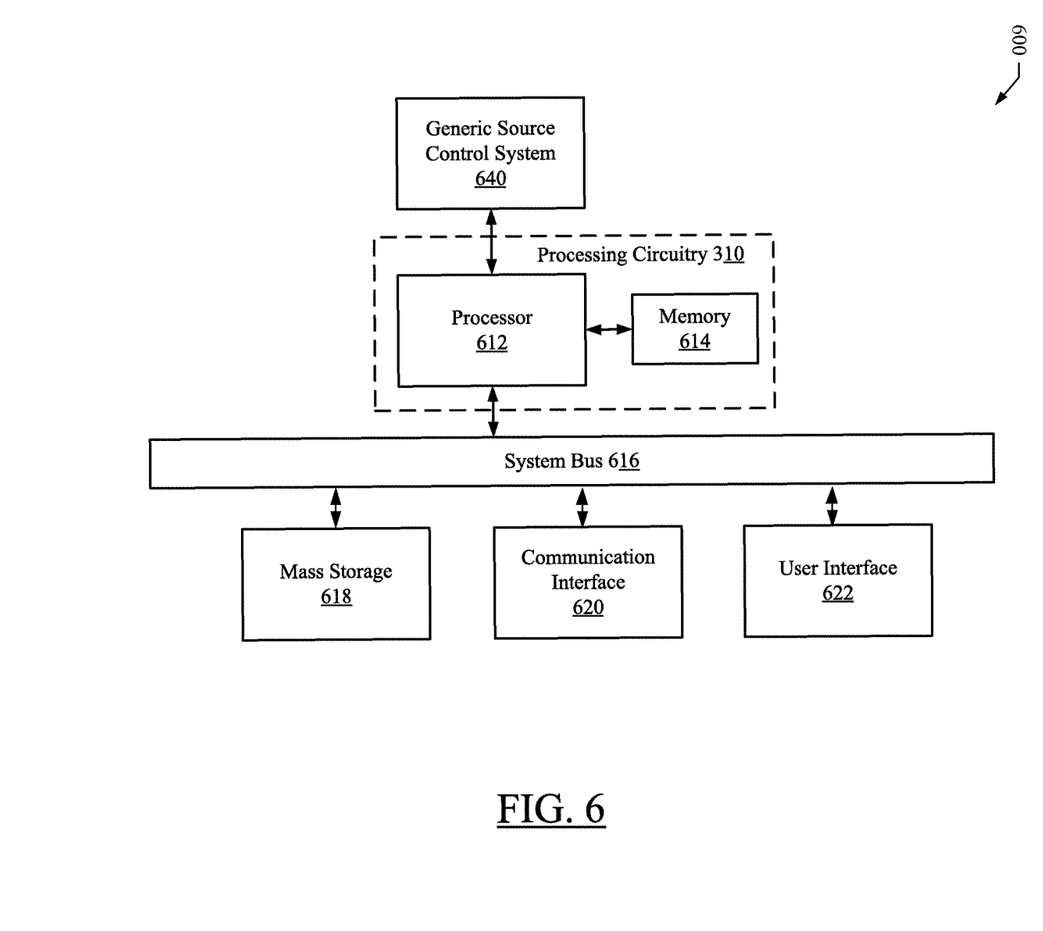
FIG. 6 is block diagram illustrating an exemplary computing device which may implement the embodiments described herein.

FIG. 6 is a diagram of an example computing system 600 that may be used to implement some example embodiments of a generic source control system. The computing system 600 may be implemented on any computing device or plurality of computing devices that may be configured to implement one or more example embodiments. By way of non-limiting example, in some embodiments, the computing system 600 may be implemented on a user terminal and/or a computing platform(s) of a converged infrastructure.

The computing system may include a plurality of elements, such as processing circuitry 610, mass storage 618, communication interface 620, and user interface 622, which may be interfaced via a system bus 616. It will be appreciated that the components, devices or elements illustrated in and described with respect to FIG. 6 below may not be mandatory and thus some may be omitted in certain embodiments. Additionally, the computing system 600 of some embodiments may include further or different components, devices or elements beyond those illustrated in and described with respect to FIG. 6.

Further, while FIG. 6 illustrates an architecture including elements interfaced via the system bus 616, it will be appreciated that in some example embodiments, elements of the computing system 600 may be implemented in a distributed computing environment in which elements may be distributed across a plurality of computing devices, which may be in communication with each other, such as via a network, to provide functionality of the computing system 600. As such, in some example embodiments, elements of the computing system 600 may be communicatively coupled via a network in addition to or in lieu of the system bus 616.

The computing system 600 of some example embodiments may implement an operating system(s), such as MICROSOFT WINDOWS™ UNIX™ LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating system. It should be appreciated; however, that in some embodiments, one or more aspects of the computing system 600 may be implemented on and/or integrated with a virtualized computing system, such as may be provided by a converged infrastructure.

In some example embodiments, the computing system 600 may include processing circuitry 610 that is configurable to perform actions in accordance with one or more example embodiments disclosed herein. In this regard, the processing circuitry 610 may be configured to perform and/or control performance of one or more functionalities for a generic source control service for an orchestration workflow, such as functionalities of generic source control system 640, in accordance with various example embodiments. Thus, the processing circuitry 610 may be configured to perform data processing, application execution and/or other processing and management services according to one or more example embodiments.

In some example embodiments, the processing circuitry 610 may include a processor 612 and, in some embodiments, such as that illustrated in FIG. 6, may further include memory 614. The processing circuitry 610 may be in communication with (e.g., via system bus 616) and/or otherwise control mass storage 618, communication interface 620, and/or user interface 622.

The processor 612 may be embodied in a variety of forms. For example, the processor 612 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 612 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 600 is embodied as a plurality of computing devices, a plurality of processors, which may collectively form the processor 612, may be distributed across a plurality of computing devices that may be in operative communication with each other directly and/or via a network. In some example embodiments, the processor 612 may be configured to execute instructions that may be stored in a memory, such as the memory 614 and/or the mass storage 618 and/or that may be otherwise accessible to the processor 612. As such, whether configured by hardware or by a combination of hardware and software, the processor 612 may be capable of performing operations according to various embodiments while configured accordingly.

In embodiments including the memory 614, the memory 614 may include read only memory (ROM), random access memory (RAM), and/or the like. The mass storage 618 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 618 may provide a persistent data storage device. In some example embodiments, the mass storage 618 may be configured to provide a backup storage. The mass storage 618 may include a memory device implemented locally to the computing system 600 and/or a memory device remote to the computing system 600, which may be communicatively coupled with the computing system 600, such as via a network. In some embodiments in which the computing system 600 is embodied as a plurality of computing devices, the memory 614 and/or mass storage 618 may include a plurality of memory devices, which may be distributed across a plurality of computing devices that may be in operative communication with each other directly and/or via a network to form the computing system 600.

In some embodiments, the memory 614 and/or the mass storage 618 may provide a non-transitory computer-readable storage medium that may store computer program instructions that may be executed by the processor 612. In this regard, the memory 614 and/or mass storage 618 may be configured to store information, data, applications, instructions and/or the like for enabling the computing system 600 to carry out various functions in accordance with one or more example embodiments. Applications that may be executed by the processor 612 may also be in the form of modulated electronic signals that may be accessed via a network modem or other network interface of the computing system 600.

The computing system 600 may further include a communication interface 620. The communication interface 620 may enable the computing system 600 to communicate (e.g., over a network or other communication interface) with another computing device or system, such as a converged infrastructure. In this regard, the communication interface 620 may include one or more interface mechanisms for enabling communication with other devices and/or networks. As such, the communication interface 620 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 600 may include the user interface 622. It will be appreciated, however, that in some example embodiments, one or more aspects of the user interface 622 may be omitted, and in some embodiments, the user interface 622 may be omitted entirely. The user interface 622 may be in communication with the processing circuitry 610 to receive an indication of a user input and/or to provide an audible, visual, mechanical, or other output to a user. As such, the user interface 622 may include, for example, a keyboard, a mouse, a joystick, a display, a touch screen display, a microphone, a speaker, one or more biometric input devices, and/or other input/output mechanisms.

As shown in FIG. 6, in some example embodiments, a generic source control system 640 interfaces with computing system 600. As discussed above in connection with FIG. 4, the generic source control system 640 may be configured to facilitate managing different orchestration workflow formats associated with different orchestration workflow engines.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a generic source control system, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a generic source control system is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, virtual private network (VPN), local area network (LAN), etc.) using any communication medium and protocols (e.g. transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VBScript, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A computer implemented method for generic source control service for an orchestration workflow, the method comprising:
    receiving orchestration workflow information from an orchestration workflow engine, wherein the orchestration workflow information is comprised of a start point, and one or more end points and one or more steps, and wherein the received orchestration workflow information is in a native file format, wherein the native file format is a format used by an orchestration workflow engine that was used to create the orchestration workflow information;
    converting the received orchestration workflow information from the native file format to a predefined format;
    receiving a request to check in the converted orchestration workflow information;
    responsive to receiving the request to check in the converted orchestration, storing the converted orchestration workflow information in a source control system;
    receiving, from a client computer, a request to check out the converted orchestration workflow information;
    responsive to receiving the request to check out the converted orchestration workflow information, generating orchestration workflow change information, wherein the orchestration workflow change information is information indicating changes that have been made to the orchestration workflow information; and
    transmitting the orchestration workflow change information to the client computer.

2. The method of claim 1, wherein the orchestration workflow information is received via a plug-in to the orchestration workflow engine.

3. The method of claim 1, wherein the predefined format is a text based format.

4. The method of claim 3, wherein the text based format is an extensible markup language (XML).

5. The method of claim 1, further comprising:
    assigning a version identifier to the converted orchestration workflow information; and
    storing the assigned version identifier in association with the stored converted orchestration workflow information.

6. The method of claim 1, further comprising:
    registering the generic source control service with an orchestration workflow engine.

7. The method of claim 1, further comprising:
    receiving a workflow invocation request, wherein the workflow invocation request includes information identifying an orchestration workflow to be invoked by an orchestration workflow engine;
    determining that a version of the identified orchestration workflow stored in the source control system is newer than a corresponding version of the identified orchestration workflow stored in association with the orchestration workflow engine; and
    selecting the version of the identified orchestration workflow stored in the source control system for execution by the orchestration workflow engine.

8. A computer implemented system for generic source control for orchestration workflows, the system comprising:
    at least one processor; and
    at least one memory storing computer program code, wherein the at least one memory and stored computer program code are configured, with the at least one processor, to cause the system to at least:
        receive orchestration workflow information from an orchestration workflow engine, wherein the orchestration workflow information is comprised of a start point, and one or more end points and one or more steps, and wherein the received orchestration workflow information is in a native file format, wherein the native file format is a format used by an orchestration workflow engine that was used to create the orchestration workflow information;
        convert the received orchestration workflow information from the native file format to a predefined format;
        receive a request to check in the converted orchestration workflow information;
        responsive to receiving the request to check in the converted orchestration, store the converted orchestration workflow information in a source control system;
        receive, from a client computer, a request to check out the converted orchestration workflow information;
        responsive to receiving the request to check out the converted orchestration workflow information, generate orchestration workflow change information, wherein the orchestration workflow change information is information indicating changes that have been made to the orchestration workflow information; and
        transmit the orchestration workflow change information to the client computer.

9. The system of claim 8, wherein the orchestration workflow information is received via a plug-in to the orchestration workflow engine.

10. The system of claim 8, wherein the predefined format is a text based format.

11. The system of claim 10, wherein the text based format is an extensible markup language (XML).

12. The system of claim 8, wherein the at least one memory and stored computer program code are configured, with the at least one processor, to further cause the system to:
assign a version identifier to the converted orchestration workflow information; and
store the assigned version identifier in association with the stored converted orchestration workflow information.

13. The system of claim 8, wherein the at least one memory and stored computer program code are configured, with the at least one processor, to further cause the system to:
register the generic source control service with an orchestration workflow engine.

14. The system of claim 8, wherein the at least one memory and stored computer program code are configured, with the at least one processor, to further cause the system to:
receive a workflow invocation request, wherein the workflow invocation request includes information identifying an orchestration workflow to be invoked by an orchestration workflow engine;
determine that a version of the identified orchestration workflow stored in the source control system is newer than a corresponding version of the identified orchestration workflow stored in association with the orchestration workflow engine; and
select the version of the identified orchestration workflow stored in the source control system for execution by the orchestration workflow engine.

15. A computer program product for identifying computing resources for generic source control for orchestration workflows, the computer program product comprising at least one non-transitory computer-readable storage medium having program instructions stored thereon, which when executed by at least one processor, cause the at least one processor to perform a method comprising:
receiving orchestration workflow information from an orchestration workflow engine, wherein the orchestration workflow information is comprised of a start point, and one or more end points and one or more steps, and wherein the received orchestration workflow information is in a native file format, wherein the native file format is a format used by an orchestration workflow engine that was used to create the orchestration workflow information;
converting the received orchestration workflow information from the native file format to a predefined format;
receiving a request to check in the converted orchestration workflow information;
responsive to receiving the request to check in the converted orchestration, storing the converted orchestration workflow information in a source control system;
receiving, from a client computer, a request to check out the converted orchestration workflow information;
responsive to receiving the request to check out the converted orchestration workflow information, generating orchestration workflow change information, wherein the orchestration workflow change information is information indicating changes that have been made to the orchestration workflow information; and
transmitting the orchestration workflow change information to the client computer.

16. The computer program product of claim 15, wherein the orchestration workflow information is received via a plug-in to the orchestration workflow engine.

17. The computer program product of claim 15, wherein the predefined format is a text based format.

18. The computer program product of claim 17, wherein the text based format is an extensible markup language (XML).

19. The computer program product of claim 15, wherein the least one non-transitory computer-readable storage medium having program instructions stored thereon, which when executed by the at least one processor, cause the at least one processor to perform a method further comprising:
assigning a version identifier to the converted orchestration workflow information; and
storing the assigned version identifier in association with the stored converted orchestration workflow information.

20. The computer program product of claim 15, wherein the at least one non-transitory computer-readable storage medium having program instructions stored thereon, which when executed by the at least one processor, cause the at least one processor to perform a method further comprising:
receiving a workflow invocation request, wherein the workflow invocation request includes information identifying an orchestration workflow to be invoked by an orchestration workflow engine;
determining that a version of the identified orchestration workflow stored in the source control system is newer than a corresponding version of the identified orchestration workflow stored in association with the orchestration workflow engine; and
selecting the version of the identified orchestration workflow stored in the source control system for execution by the orchestration workflow engine.

* * * * *